(12) United States Patent
Maani et al.

(10) Patent No.: US 8,787,444 B2
(45) Date of Patent: Jul. 22, 2014

(54) DIFFERENTIAL CODING OF INTRA DIRECTIONS (DCIC)

(75) Inventors: Ehsan Maani, San Jose, CA (US); Wei Liu, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 13/176,132

(22) Filed: Jul. 5, 2011

(65) Prior Publication Data

US 2012/0014443 A1    Jan. 19, 2012

Related U.S. Application Data

(60) Provisional application No. 61/365,304, filed on Jul. 16, 2010, provisional application No. 61/447,965, filed on Mar. 1, 2011.

(51) Int. Cl.
  *H04N 7/32*    (2006.01)
  *H04N 7/34*    (2006.01)
  *H04N 7/26*    (2006.01)

(52) U.S. Cl.
  CPC ... *H04N 19/00551* (2013.01); *H04N 19/00763* (2013.01)
  USPC .......................................... 375/240; 382/236

(58) Field of Classification Search
  USPC .......................................... 375/240; 382/238
  See application file for complete search history.

(56) References Cited

U.S. PATENT DOCUMENTS

| | | | |
|---|---|---|---|
| 6,381,285 B1 | 4/2002 | Borer | |
| 6,408,109 B1 * | 6/2002 | Silver et al. | 382/300 |
| 6,442,202 B1 * | 8/2002 | Borer | 375/240.16 |
| 6,697,660 B1 | 2/2004 | Robinson | |
| 7,536,035 B2 * | 5/2009 | Kikuchi | 382/107 |
| 8,331,720 B2 * | 12/2012 | Toraichi et al. | 382/266 |
| 8,442,334 B2 * | 5/2013 | Drugeon et al. | 382/238 |

(Continued)

FOREIGN PATENT DOCUMENTS

WO    2010102935 A1    9/2010

OTHER PUBLICATIONS

Thomas Wiegand et al, "Overview of the H.264/AVC Video Coding Standard" , IEEE Transactions on Circuits and Systems for Video Technology, vol. 13, No. 7, Jul. 2003, pp. 560-576.

(Continued)

*Primary Examiner* — Sath V Perungavoor
*Assistant Examiner* — Howard D Brown, Jr.
(74) *Attorney, Agent, or Firm* — Haverstock & Owens LLP (57) ABSTRACT

Spatial domain directional intra prediction has been shown to be very effective to remove the correlation between the pixels in the current block and reconstructed neighbors. In AVC, 8 directional prediction modes (plus the DC prediction mode) are defined. The prediction mode number is signaled to the decoder using a simple predictive coding method. The previous intra prediction methods have two major disadvantages: lack of precision for arbitrary directional patterns and accuracy lack of accuracy to exploit geometric dependency between blocks. To address these issues, a new method accurately predicts the intra directions from reconstructed neighboring pixels and differentially encode the intra directions. This allows a more precise directional prediction without the significant increase in the cost for transmitting the side information.

23 Claims, 4 Drawing Sheets

(56) References Cited

U.S. PATENT DOCUMENTS

| | | | |
|---|---|---|---|
| 2002/0047907 A1* | 4/2002 | Chen et al. | 348/222 |
| 2006/0165171 A1 | 7/2006 | Cha et al. | |
| 2007/0036215 A1 | 2/2007 | Pan et al. | |
| 2008/0304763 A1 | 12/2008 | Nagori | |
| 2009/0016436 A1 | 1/2009 | Park et al. | |
| 2009/0225834 A1* | 9/2009 | Song et al. | 375/240.12 |
| 2009/0268810 A1 | 10/2009 | Dai | |
| 2009/0296808 A1 | 12/2009 | Regunathan et al. | |
| 2010/0128995 A1 | 5/2010 | Drugeon et al. | |
| 2010/0295922 A1* | 11/2010 | Cheung et al. | 348/42 |
| 2011/0188574 A1* | 8/2011 | Matsuo et al. | 375/240.12 |
| 2011/0235921 A1* | 9/2011 | Springer et al. | 382/199 |
| 2012/0020580 A1* | 1/2012 | Sasai et al. | 382/233 |
| 2012/0082219 A1* | 4/2012 | Sun et al. | 375/240.12 |
| 2013/0028530 A1* | 1/2013 | Drugeon et al. | 382/233 |

OTHER PUBLICATIONS

"H.264/MPEG4 Part 10", Video Compression; Video Coding for Next-generation Multimedia, Iain E. G. Richardson, 2003, John Wiley & Sons, Ltd. ISBN:0470848375, pp. 259-223.

Heiko Schwartz, et al., "Overview of the Scalable Video Coding Extension of the H.264/AVC Standard", IEEE Transactions on Circuit and Systems for Video Technology, Sep. 2007, pp. 1-18.

Yung-Lyul Lee et al., "Improved Lossless Intra Coding for H264/MPEG-4 AVC", IEEE Transactions on Image Processing, vol. 15, No. 9, Sep. 2006, pp. 2610-2615.

TK Tan et al., "Recommended Simulation Common Conditions for Coding Efficiency Experiments", ITU-Telecommunications Standardization Sector, Study Group 16 Questions 6 Video Coding Experts Group (VCEG), 36th Meeting: San Diego, USA Jul. 8-10, 2008, Document VCEG-AJ10r1, File Name: VCEG-AJ10r1.DOC.

* cited by examiner

DIFFERENTIAL CODING OF INTRA DIRECTIONS (DCIC)

CROSS-REFERENCE TO RELATED APPLICATION(S)

This application claims priority under 35 U.S.C. §119(e) of the U.S. Provisional Patent Application Ser. No. 61/365,304, filed Jul. 16, 2010 and titled, "DIFFERENTIAL CODING OF INTRA DIRECTIONS (DCIC)" and U.S. Provisional Patent Application Ser. No. 61/447,965, filed Mar. 1, 2011 and titled, "DIFFERENTIAL CODING OF INTRA DIRECTIONS (DCIC)." The Provisional Patent Applications Ser. No. 61/365,304, filed Jul. 16, 2010 and titled, "DIFFERENTIAL CODING OF INTRA DIRECTIONS (DCIC)" and Ser. No. 61/447,965, filed Mar. 1, 2011 and entitled, "DIFFERENTIAL CODING OF INTRA DIRECTIONS (DCIC)" are also hereby incorporated by reference in their entirety for all purposes.

FIELD OF THE INVENTION

The present invention relates to the field of image processing. More specifically, the present invention relates to intra coding of high definition videos.

BACKGROUND OF THE INVENTION

Spatial domain directional intra prediction has been shown to be very effective to remove the correlation between the pixels in the current block and reconstructed neighbors. In AVC, 8 directional prediction modes (plus the DC prediction mode) are defined. The prediction mode number is signaled to the decoder using a simple predictive coding method. The basic intra prediction has two major disadvantages: 1) the small number of directions does not provide sufficient precision to cover arbitrary directional patterns; and 2) the mode number prediction from neighbors is not accurate enough to exploit the geometric dependency between blocks. Increasing the number of directions typically results in a lower residual energy; however, the cost for signaling the prediction mode is able to also increase significantly such that the little gain is observed. This is particularly the case for small block sizes such as 4×4 or 8×8.

SUMMARY OF THE INVENTION

Spatial domain directional intra prediction has been shown to be very effective to remove the correlation between the pixels in the current block and reconstructed neighbors. In AVC, 8 directional prediction modes (plus the DC prediction mode) are defined. The prediction mode number is signaled to the decoder using a simple predictive coding method. The previous intra prediction methods have two major disadvantages: lack of precision for arbitrary directional patterns and accuracy lack of accuracy to exploit geometric dependency between blocks. To address these issues, a new method accurately predicts the intra directions from reconstructed neighboring pixels and differentially encode the intra directions. This allows a more precise directional prediction without the significant increase in the cost for transmitting the side information.

In one aspect, a method of encoding an image programmed in a controller in a device comprises applying operators to neighboring pixels of a block to obtain an image gradient vector for each of the pixels, determining an edge direction for each of the pixels by taking a perpendicular direction to each of the gradient vectors and predicting a best direction using the edge direction for each of the pixels. The best direction is used in intra coding in encoding the image. Predicting further comprises deriving the best direction using a summation of the square of projections of direction vectors onto a unit vector. Predicting further comprises deriving the best direction by calculating an eigenvector using a matrix and then using a lookup table to convert the eigenvector to the best direction. The best direction is adjusted by a direction adjustment. The direction adjustment is implemented using discrete values with a quantization step size. The quantization step size implements a confidence measure, wherein the higher the confidence measure, the smaller the quantization step size. The confidence measure is compared to a threshold for choosing between two pre-defined step size values for the quantization step size. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, an apparatus for encoding an image programmed in a controller in a device comprises an image gradient vector module for applying operators to neighboring pixels for obtaining an image gradient vector for each of the pixels, an edge detection module for determining an edge direction for each of the pixels by taking a perpendicular direction to each of the gradient vectors and a best direction module for predicting a best direction using the edge direction of each of the pixels. The best direction is used in intra coding in encoding the image. The best direction module is further for deriving the best direction using a summation of the square of projections of direction vectors onto a unit vector. Predicting further comprises deriving the best direction by calculating an eigenvector using a matrix and then using a lookup table to convert the eigenvector to the best direction. The best direction is adjusted by a direction adjustment. The direction adjustment is implemented using discrete values with a quantization step size. The quantization step size implements a confidence measure, wherein the higher the confidence measure, the smaller the quantization step size. The confidence measure is compared to a threshold for choosing between two pre-defined step size values for the quantization step size. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In yet another aspect, a device comprises a memory for storing an application, the application for applying operators to neighboring pixels of a block to obtain an image gradient vector for each of the pixels, determining an edge direction for each of the pixels by taking a perpendicular direction to each of the gradient vectors and predicting a best direction using the edge direction for each of the pixels and a processing component coupled to the memory, the processing component configured for processing the application. The best direction is used in intra coding in encoding the image. Predicting further comprises deriving the best direction using a summation of the square of projections of direction vectors onto a unit vector. Predicting further comprises deriving the best direction by calculating an eigenvector using a matrix and then using a lookup table to convert the eigenvector to the best direction. The best direction is adjusted by a direction adjustment. The direction adjustment is implemented using discrete values with a quantization step size. The quantization step size implements a confidence measure, wherein the higher the confidence measure, the smaller the quantization step size. The confidence measure is compared to a threshold for choosing between two pre-defined step size values for the quantization step size.

In another aspect, a method of encoding an image programmed in a controller in a device comprises differentially encoding is implemented for a direction if the direction is close to suggested directions of neighbors of the direction and otherwise, using a simple fixed length code to signal the direction of the direction. Differentially encoding further comprises applying operators to neighboring pixels of a block to obtain an image gradient vector for each of the pixels, determining an edge direction for each of the pixels by taking a perpendicular direction to each of the gradient vectors and predicting a best direction using the edge direction for each of the pixels. The best direction is used in intra coding in encoding the image. Predicting further comprises deriving the best direction using a summation of the square of projections of direction vectors onto a unit vector. Predicting further comprises deriving the best direction by calculating an eigenvector using a matrix and then using a lookup table to convert the eigenvector to the best direction. The best direction is adjusted by a direction adjustment. The direction adjustment is implemented using discrete values with a quantization step size. The quantization step size implements a confidence measure, wherein the higher the confidence measure, the smaller the quantization step size. The confidence measure is compared to a threshold for choosing between two pre-defined step size values for the quantization step size. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

DETAILED DESCRIPTION OF THE PREFERRED EMBODIMENT

To address the problems of previous intra prediction methods, a new method accurately predicts the intra directions from reconstructed neighboring pixels and differentially encodes the intra directions. This allows a more precise directional prediction without the significant increase in the cost for transmitting the side information.

Figure 1A:
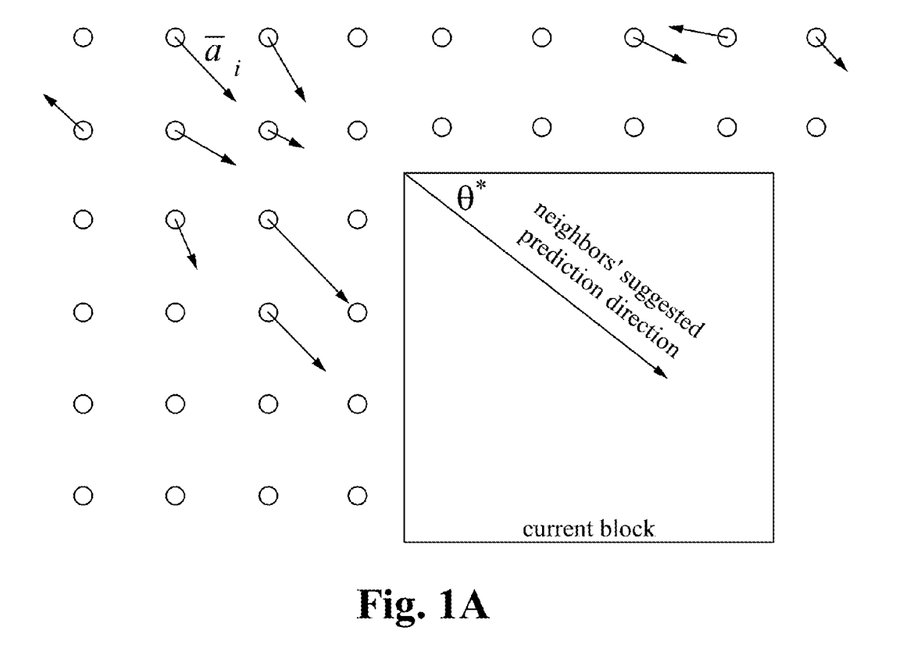
FIG. 1A illustrates a diagram of a computation of the neighbors' suggested direction according to some embodiments.

The method described herein takes advantage of the available edge information in the reconstructed neighborhood of the block to be coded. To encode an image block, the well-known Sobel operators:

$$G_x = \begin{bmatrix} -1 & 0 & 1 \\ -2 & 0 & 2 \\ -1 & 0 & 1 \end{bmatrix}, \quad G_y = \begin{bmatrix} -1 & -2 & -1 \\ 0 & 0 & 0 \\ 1 & 2 & 1 \end{bmatrix}$$

are first applied for a block's available neighboring pixels as illustrated in FIG. 1A to obtain the image gradient vectors. For each pixel, the edge direction is obtained by taking the perpendicular direction to its gradient vector. Edge direction vectors commonly are not perfectly aligned. Therefore, finding the best prediction direction with a high precision using the edge direction vectors is not a trivial task. Simple averaging of the vectors performs poorly.

The best prediction direction with a high precision using the computed edge vectors is derived. $\bar{a}_i (i=1,2,\ldots N)$ denotes all of the considered edge vectors, and $\hat{e}$ denotes an arbitrary unit vector which makes an angle theta ($\theta$) with the horizontal axis. A function $S(\theta)$ is defined as:

$$S(\theta) = \sum_{i=1}^{N} \langle \hat{e}, \bar{a}_i \rangle^2 \qquad (1)$$

where $\langle,\rangle$ denotes the inner product between two vectors. $S(\theta)$ is the summation of the square of the projections of the direction vectors onto the unit vector $\hat{e}$. Due to the continuity of the edges in most natural images, a good prediction direction is typically close to the neighboring edge directions. Therefore, the "neighbors' suggested prediction direction" $\theta^*$ is:

$$\theta^* = \mathrm{argmax}_{\theta} S(\theta). \qquad (2)$$

To solve Equation (2), let $$\bar{a}_1 = \begin{bmatrix} x_1 \\ y_1 \end{bmatrix} \text{ and } A = \begin{bmatrix} x_1 & \cdots & x_N \\ y_1 & \cdots & y_N \end{bmatrix},$$

then, the above optimization is able to be written as:

$$\mathrm{argmax}_{\hat{e}} \hat{e}^\tau A A^\tau \hat{e},$$

subject to $|\hat{e}|=1$.

The solution to this optimization is one of the eigenvectors of the 2×2 matrix $AA^\tau$. More specifically, let the eigenvalues of $AA^\tau$ be $s_1$ and $s_2$, with $s_1 \geq s_2$. Then, the eigenvector that corresponds to $s_1$ is the solution that maximizes the objective function. A look-up table is able to be used to convert the eigenvector to $\theta^*$ which is used for the prediction of the image sample values.

Figure 1B:
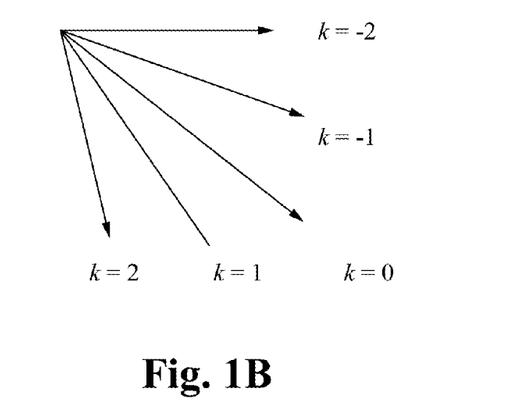
FIG. 1B illustrates a diagram of additional directions around the neighbors' suggested directions according to some embodiments.

Instead of directly using θ* as the prediction direction for the current block, θ* is able to be adjusted by an angle of Δθ, and the direction of $θ_{opt}=θ*+Δθ$ is used as the true prediction direction. Therefore, the direction adjustment Δθ is signaled to the decoder. For this purpose, Δθ is quantized into discrete values with a quantization step size of δθ, and the quantization index $$k=[Δθ/δθ] \quad (3)$$

is signaled, where [·] denotes rounding to the nearest integer (as illustrated in FIG. 1B). Upon receiving k, the decoder uses θ*+kδθ for the directional direction. This is able to be seen as differential encoding of the intra directions with respect to a predicted direction θ* which is acquired from the neighboring reconstructed blocks. Equation 2 shows one way to compute this predicted or suggested direction; however, the proposed signaling method will work efficiently with any accurate direction estimation method.

In order to determine the direction quantization step size δθ, the following "confidence" measure is also introduced:

$$s = \frac{S(θ^*)}{\sum_{i=1}^{N}|\bar{a}_i|^2} = \frac{s_1}{s_1 + s_2} \quad (4)$$

The set, s∈(0,1) where s=1 represents a perfect edge vector alignment. Typically, a large value of s means higher confidence from neighbors, and a smaller quantization step size is able to be used. Therefore, δθ should be a decreasing function of s. In the implementation, s is compared to a threshold to choose from two pre-defined step size values.

The encoding of the signaling k employs several new contexts in Context-Adaptive Binary Arithmetic Coding (CABAC), with k binarized using a truncated unary code with sign.

Image signal prediction in an arbitrary direction is a useful tool for the new directions. The algorithm is described as follows: 1) for each pixel, draw a straight line along the prediction direction; 2) in a pre-defined neighborhood, find the reconstructed pixels that are close to that line; and 3) compute the prediction of the pixel by using an interpolation of the selected neighbors. Step 2) and the coefficients of the interpolation filter are able to be obtained efficiently using a lookup table.

On top of the new directional prediction modes, a one bit flag is signaled to the decoder to identify whether it should use neighbors' suggested direction and differentially code the actual prediction direction or keep the signaling method of AVC (fixed length codes). In the case of AVC mode, no change has been made in signaling of the modes. Nonetheless, the computation of the most probable mode may be different as the neighboring blocks may be predicted using one of the new modes.

Since the decoder is able to perform the edge detection operation and therefore has access to the neighbors' suggested direction θ* as well as s, it is able to obtain the same prediction as the encoder and hence stays in synchronization with the encoder.

TABLE 1

Syntax for intra prediction in tabular form.

| read_intra_pred_mode( ){ | Descriptor |
|---|---|
| use_neighb_dir | ae(v) |
| if(use_neighb_dir){ | |
| adjust_neigb_dir | ae(v) |
| }else{ | |
| most_prob_mode | ae(v) |
| if(!most_prob_mode) | |
| rem_intra_pred_mode | ae(v) |
| } | |
| } | |

In an experiment, the algorithm has been implemented for 4×4, 8×8 and 16×16 blocks. Nine new modes are defined around the neighbors' suggested direction and are differentially coded (e.g. |k|≤4). All frames (e.g. the entire sequence) are intra-coded using the high profile. Four different QPs (26, 30, 34 and 48) are considered to compute the average bit rate reduction. Approximately two seconds of video is considered for all CfP test sequences. The exact number of frames is shown in Table 2.

TABLE 2

Sequences and frame numbers used in experiments.

| Class | Sequence | Start Frame | Frames to be Encoded |
|---|---|---|---|
| A | Traffic | 0 | 65 |
|   | People on Street | 0 | 65 |
| B1 | Kimono | 116 | 49 |
|   | ParkScene | 0 | 49 |
| B2 | Cactus | 0 | 97 |
|   | BasketballDrive | 0 | 97 |
|   | BQTerrace | 0 | 129 |
| C | BasketballDrill | 0 | 97 |
|   | BQMall | 0 | 129 |
|   | PartyScene | 0 | 97 |
|   | RaceHorses | 0 | 65 |
| D | BasketballPass | 0 | 97 |
|   | BQSquare | 0 | 129 |
|   | BlowingBubbles | 0 | 97 |
|   | RaceHorses | 0 | 65 |
| E | Vidyo1 | 0 | 129 |
|   | Vidyo3 | 0 | 129 |
|   | Vidyo4 | 0 | 129 |

Table 3 lists these bit rate reductions for various resolutions and test sequences.

TABLE 3

Average bit rate reduction of various test sequences/resolutions.

| Sequence/Resolution | | BD rate % |
|---|---|---|
| Class A | Traffic | −3.84 |
|   | People on Street | −6.41 |
| Class A Average | | −5.13 |
| Class B | Basketball Drive | −5.14 |
|   | BQ Terrace | −5.47 |
|   | Cactus | −5.90 |
|   | Kimono | −2.02 |
|   | Park Scene | −0.66 |
| Class B Average | | −3.84 |
| Class C | Basketball Drill | −13.01 |
|   | BQ Mall | −4.70 |
|   | Party Scene | −2.40 |
|   | Race Horses | −3.78 |
| Class C Average | | −5.97 |
| D | Basketball Pass | −5.89 |
|   | Blowing Bubbles | −4.17 |

TABLE 3-continued

Average bit rate reduction of various test sequences/resolutions.

| Sequence/Resolution | | BD rate % |
|---|---|---|
| | BQ Square | −5.21 |
| | Race Horses | −4.97 |
| Class D Average | | −5.06 |
| E | Vidyo1 | −9.16 |
| | Vidyo3 | −8.63 |
| | Vidyo4 | −6.24 |
| Class E Average | | −8.01 |
| AVERAGE | | −5.42 |

Due to its accurate prediction of direction estimation and low signaling overhead, the method significantly improves the coding efficiency of intra pictures in AVC. DCIC is able to be implemented for an arbitrary block size and number of directions: if the direction to be coded is close to neighbors' suggested direction, the direction is differentially coded with respect to the neighbors' suggested direction. Otherwise, a simple fixed length code is used to signal the direction to the decoder. The decision whether to use neighbors' suggested direction is made by the encoder in an RD optimized fashion and thus also transmitted in the bit stream. The determination of whether the direction to be coded is "close" to neighbors' suggested direction is able to be any implementation such as using a threshold limiting what is close and what is not.

In addition to intra prediction, other parts of the codec such as Transform or Adaptive Loop Filter (ALF) are also able to benefit from the edge detection described herein. This enables efficient reuse of the computation to improve overall performance of the codec.

Figure 2:
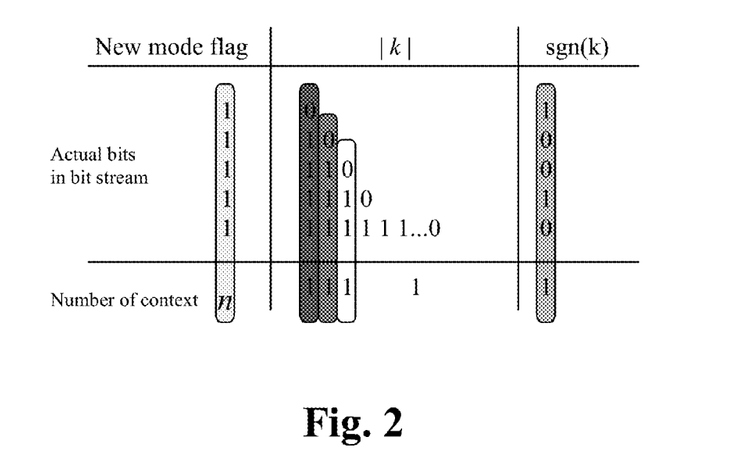
FIG. 2 illustrates a diagram of a bitstream according to some embodiments.

FIG. 2 illustrates a diagram of a bitstream according to some embodiments. Given a most probable prediction direction (MPD) from the neighbors, signaling of the directions are done differently. For small angles around the most probable direction, the difference in angle between actual direction and the predicted direction is signaled using unary codes. For angles that are not close to the MPD, fixed length code is used as in AVC.

Letting k=0, denote the MPD derived from the neighbors using any method (including edge detection). For a number of directions around MPD, the following signaling is used: first a "1" is sent, indicating that the new mode is used. Then, a unary code is sent for the signaling of k. For other directions (suppose there are N such directions), a "0" is sent first, indicating that the new mode is not used, and then a fixed length code of log2(N) bits is sent to represent the true direction.

Figure 3:
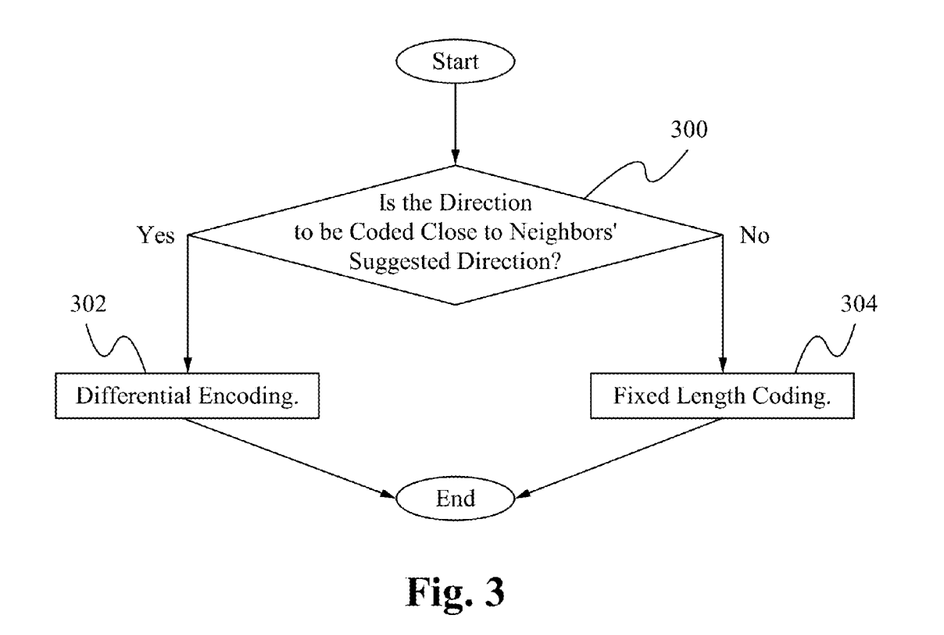
FIG. 3 illustrates a flowchart of a method of selecting an encoding mode according to some embodiments.

FIG. 3 illustrates a flowchart of a method of selecting an encoding mode according to some embodiments. In the step 300, it is determined if the direction to be coded is close to neighbors' suggested direction. Close is able to be defined in the implementation, for example +/− a few degrees. If the direction is close, then differential encoding is implemented as described herein, in the step 302. If the direction is not close, then a fixed length code is used to signal the direction. Fewer or additional steps are able to be included. Further, the order of the steps is able to be changed where possible.

Figure 4:
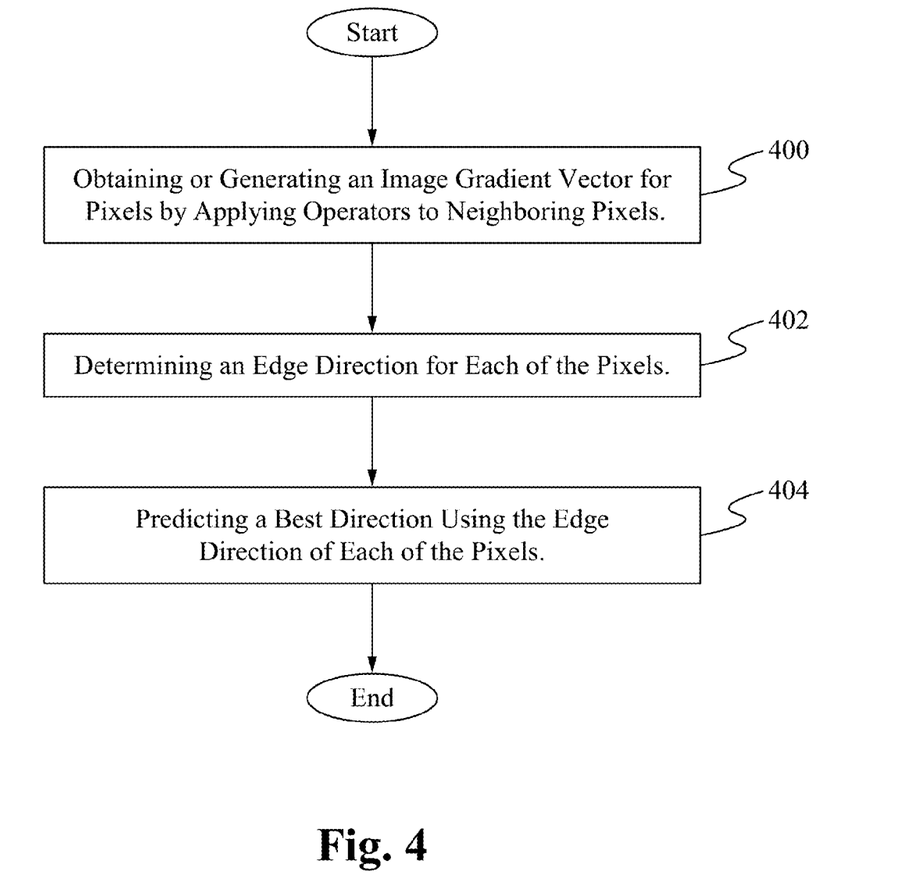
FIG. 4 illustrates a flowchart of a method of determining a best direction for intra coding according to some embodiments.

FIG. 4 illustrates a flowchart of a method of determining a best direction for intra coding according to some embodiments. In the step 400, operators, such as Sobel operators are applied to neighboring pixels of a pixel to obtain an image gradient vector for each of the neighboring pixels. In some embodiments, only a select number of neighboring pixels are used. In the step 402, an edge direction is determined for each of the neighboring pixels by taking a perpendicular direction to each of the gradient vectors. In the step 404, a best direction is predicted using the edge direction of each of the pixels. Fewer or additional steps are able to be included. Further, the order of the steps is able to be changed where possible.

Figure 5:
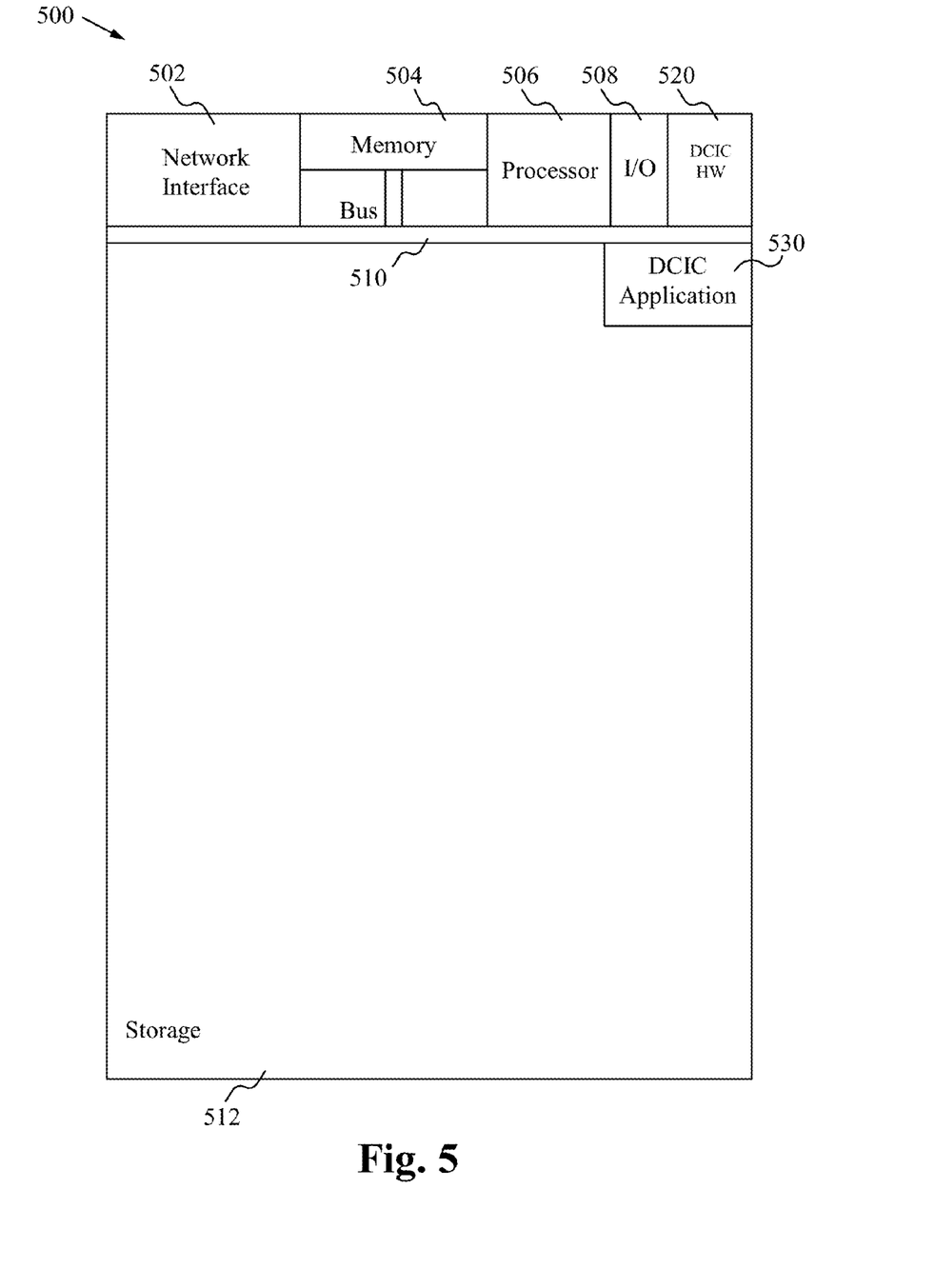
FIG. 5 illustrates a block diagram of an exemplary computing device configured to implement the differential coding of intra directions method according to some embodiments.

FIG. 5 illustrates a block diagram of an exemplary computing device 500 configured to implement the Differential Coding of Intra Directions (DCIC) method according to some embodiments. The computing device 500 is able to be used to acquire, store, compute, process, communicate and/or display information such as images and videos. For example, a computing device 500 is able to acquire and store a video. The DCIC method is able to be used during or after acquiring the video, or when displaying the video on the device 500. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors and other hardware to perform parallel processing. DCIC application(s) 530 used to perform the improved encoding method are likely to be stored in the storage device 512 and memory 504 and processed as applications are typically processed. More or less components shown in FIG. 5 are able to be included in the computing device 500. In some embodiments, DCIC hardware 520 is included. Although the computing device 500 in FIG. 5 includes applications 530 and hardware 520 for implementing the DCIC method, the DCIC method is able to be implemented on a computing device in hardware, firmware, software or any combination thereof. For example, in some embodiments, the DCIC applications 530 are programmed in a memory and executed using a processor. In another example, in some embodiments, the DCIC hardware 520 is programmed hardware logic including gates specifically designed to implement the encoding method.

In some embodiments, the DCIC application(s) 530 include several applications and/or modules. Modules such as an image gradient vector module for applying operators to neighboring pixels for obtaining image gradient vectors, an edge detection module for determining an edge direction for each of the pixels and a best direction module for predicting a best direction using the edge direction of each of the pixels are able to perform the functions described herein. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device.

In some embodiments, only one pixel in a boundary of a block is used for determining or deriving an edge of a block to be predicted. Three pixels are used for gradient computation, and one pixel is used for edge derivation based on the gradient. This implementation is able to replace prior implementations such that instead of using five pixels for gradient computation, only three pixels are used, and instead of using three pixels for edge derivation, only one pixel is used. A lookup table is able to be used which would remove floating-point operations/variables. Precision in directions for Chroma components is increased (similar to Luma). VLC tables are able to be used for low complexity cases. Furthermore, this implementation will provide better context initialization.

An example of edge derivation is described:

$$\sigma_1 = 2\sum_i x_i y_i$$

$$\sigma_2 = \sum_i x_i^2 y_i^2$$

where $\nabla_i$- $(x_i, y_i)$ are local gradients of the image. The ratio of $\sigma_1$ over $\sigma_2$ is computed with 8 bit precision. Then, the results are compared with the following table to determine the index to the actual direction:

const UInt TcomPattern::m_uiSigma2SlopeIdx[32]{4, 12, 21, 30, 39, 49, 59, 69, 80, 92, 105, 118, 132, 147, 164, 182, 202, 225, 249, 278, 310, 348, 393, 448, 516, 604, 723, 892, 1157, 1629, 2725, 8192};

Details are able to be extracted from the following function:

```
Int TComPattern::xComputeSlope(Int64 dSigma1, Int64 dSigma2)
{
    Int iSlope = 65;
    Uint uiRegionIdx = 0;
    if (dSigma1>=O && dSigma2 >=0)
        uiRegionIdx = 0;
    else if (dSigma2 < 0 && dSigma1 >=0)
        uiRegionIdx = 1;
    else if (dSigma2 >= 0 && dSigma1 <0)
        uiRegionIdx = 2;
    else uiRegionIdx = 3;
    UInt64 uiSigma1 = (UInt64) abs(dSigma1);
    UInt64 uiSigma2 = (UInt64) abs(dSigma2);
        U1nt64 uiRatio = (uiSigma1 == 0) ? (33<<8) :
    (uiSigma2 << 8) / uiSigma1;
        Int iBinIdx = -1;
        if (uiRatio < m_uiSigma2SlopeIdx[0])
            iBinIdx = 0;
        else if (uiRatio >= m_uiSigma2SlopeIdx[31])
            iBinIdx = 32;
        else
        {
            for (Int i = 1; i < 32; i++)
            {
                if (uiRatio >= m_uiSigma2SlopeIdx[I-1] && uiRatio < m_uiSigma2SlopeIdx[i])
                {
                    iBinIdx = I;
                    break;
                }
            }
        }
        assert( iBinIdx > -1 && iBinIdx < 33);
        switch (uiRegionIdx)
        {
        case 0:
            islope = 6.5 + iBinIdx; //(Double) (32.0 - iBinIdx) / 32.0;
            break;
        case 1:
            iSlope = 0 + iBinIdx; //(iBinIdx == 32) ? 500 : 32.0 / (32.0 - (Double) iBinIdx);
            break;
        case 2:
            iSlope = 129 - iBinIdx; //(Double) -(32.0 - iBinIdx) / 32.0;
            break;
        case 3:
            iSlope = 64 - iBinIdx;//(iBinIdx == 32)? -500 : -32.0 / (32.0 -(Double) iBinIdx);
            break;
        default:
            assert( 0 );
            break;
        }
    return iSlope;
}
```

To utilize the DCIC method, a user acquires a video/image such as on a digital camcorder, and while or after the video is acquired, or when displaying the video, the differential coding of intra directions method is automatically used for intra coding each image of the video, so that the video is encoded efficiently while maintaining quality. The DCIC method occurs automatically without user involvement. The video is also able to be decoded to be displayed using a similar method.

In operation, differential coding of intra directions is used to encode and decode images such as frames of a video. The DCIC method accurately predicts intra directions from reconstructed neighboring pixels and differentially encodes the intra directions. This allows a more precise directional prediction without the significant increase in the cost for transmitting the side information.

Some Embodiments of Differential Coding of Intra Directions (DCIC)

1. A method of encoding an image programmed in a controller in a device comprising:
   a. applying operators to neighboring pixels of a block to obtain an image gradient vector for each of the pixels;
   b. determining an edge direction for each of the pixels by taking a perpendicular direction to each of the gradient vectors; and
   c. predicting a best direction using the edge direction for each of the pixels.

2. The method of clause 1 wherein the best direction is used in intra coding in encoding the image.

3. The method of clause 1 wherein predicting further comprises deriving the best direction using a summation of the square of projections of direction vectors onto a unit vector.

4. The method of clause 1 wherein predicting further comprises deriving the best direction by calculating an eigenvector using a matrix and then using a lookup table to convert the eigenvector to the best direction.

5. The method of clause 1 wherein the best direction is adjusted by a direction adjustment.

6. The method of clause 5 wherein the direction adjustment is implemented using discrete values with a quantization step size.

7. The method of clause 6 wherein the quantization step size implements a confidence measure, wherein the higher the confidence measure, the smaller the quantization step size.

8. The method of clause 7 wherein the confidence measure is compared to a threshold for choosing between two predefined step size values for the quantization step size.

9. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

10. An apparatus for encoding an image programmed in a controller in a device comprising:
  a. an image gradient vector module for applying operators to neighboring pixels for obtaining an image gradient vector for each of the pixels;
  b. an edge detection module for determining an edge direction for each of the pixels by taking a perpendicular direction to each of the gradient vectors; and
  c. a best direction module for predicting a best direction using the edge direction of each of the pixels.

11. The apparatus of clause 10 wherein the best direction is used in intra coding in encoding the image.

12. The apparatus of clause 10 wherein the best direction module is further for deriving the best direction using a summation of the square of projections of direction vectors onto a unit vector.

13. The apparatus of clause 10 wherein predicting further comprises deriving the best direction by calculating an eigenvector using a matrix and then using a lookup table to convert the eigenvector to the best direction.

14. The apparatus of clause 10 wherein the best direction is adjusted by a direction adjustment.

15. The apparatus of clause 14 wherein the direction adjustment is implemented using discrete values with a quantization step size.

16. The apparatus of clause 15 wherein the quantization step size implements a confidence measure, wherein the higher the confidence measure, the smaller the quantization step size.

17. The apparatus of clause 16 wherein the confidence measure is compared to a threshold for choosing between two pre-defined step size values for the quantization step size.

18. The apparatus of clause 10 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

19. A device comprising:
  a. a memory for storing an application, the application for:
    i. applying operators to neighboring pixels of a block to obtain an image gradient vector for each of the pixels;
    ii. determining an edge direction for each of the pixels by taking a perpendicular direction to each of the gradient vectors; and
    iii. predicting a best direction using the edge direction for each of the pixels; and
  b. a processing component coupled to the memory, the processing component configured for processing the application.

20. The device of clause 19 wherein the best direction is used in intra coding in encoding the image.

21. The device of clause 19 wherein predicting further comprises deriving the best direction using a summation of the square of projections of direction vectors onto a unit vector.

22. The device of clause 19 wherein predicting further comprises deriving the best direction by calculating an eigenvector using a matrix and then using a lookup table to convert the eigenvector to the best direction.

23. The device of clause 19 wherein the best direction is adjusted by a direction adjustment.

24. The device of clause 23 wherein the direction adjustment is implemented using discrete values with a quantization step size.

25. The device of clause 24 wherein the quantization step size implements a confidence measure, wherein the higher the confidence measure, the smaller the quantization step size.

26. The device of clause 25 wherein the confidence measure is compared to a threshold for choosing between two pre-defined step size values for the quantization step size.

27. A method of encoding an image programmed in a controller in a device comprising:
  a. differentially encoding is implemented for a direction if the direction is close to suggested directions of neighbors of the direction; and
  b. otherwise, using a simple fixed length code to signal the direction of the direction.

28. The method of clause 27 wherein differentially encoding further comprises:
  a. applying operators to neighboring pixels of a block to obtain an image gradient vector for each of the pixels;
  b. determining an edge direction for each of the pixels by taking a perpendicular direction to each of the gradient vectors; and
  c. predicting a best direction using the edge direction for each of the pixels.

29. The method of clause 28 wherein the best direction is used in intra coding in encoding the image.

30. The method of clause 28 wherein predicting further comprises deriving the best direction using a summation of the square of projections of direction vectors onto a unit vector.

31. The method of clause 28 wherein predicting further comprises deriving the best direction by calculating an eigenvector using a matrix and then using a lookup table to convert the eigenvector to the best direction.

32. The method of clause 28 wherein the best direction is adjusted by a direction adjustment.

33. The method of clause 32 wherein the direction adjustment is implemented using discrete values with a quantization step size.

34. The method of clause 33 wherein the quantization step size implements a confidence measure, wherein the higher the confidence measure, the smaller the quantization step size.

35. The method of clause 34 wherein the confidence measure is compared to a threshold for choosing between two pre-defined step size values for the quantization step size.

36. The method of clause 28 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding an image programmed in a controller in a device comprising:
   a. applying operators to neighboring pixels of a block to obtain an image gradient vector for each of the pixels;
   b. determining an edge direction for each of the pixels by taking a perpendicular direction to each of the gradient vectors; and
   c. predicting a best direction using the edge direction for each of the pixels; wherein the best direction is adjusted by a direction adjustment, wherein the direction adjustment is implemented using discrete values with a quantization step size, wherein the quantization step size implements a confidence measure, wherein the higher the confidence measure, the smaller the quantization step size.

2. The method of claim 1 wherein the best direction is used in intra coding in encoding the image.

3. The method of claim 1 wherein predicting further comprises deriving the best direction using a summation of the square of projections of direction vectors onto a unit vector.

4. The method of claim 1 wherein predicting further comprises deriving the best direction by calculating an eigenvector using a matrix and then using a lookup table to convert the eigenvector to the best direction.

5. The method of claim 1 wherein the confidence measure is compared to a threshold for choosing between two pre-defined step size values for the quantization step size.

6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

7. An apparatus for encoding an image programmed in a controller in a device comprising:
   a. an image gradient vector module for applying operators to neighboring pixels for obtaining an image gradient vector for each of the pixels;
   b. an edge detection module for determining an edge direction for each of the pixels by taking a perpendicular direction to each of the gradient vectors; and
   c. a best direction module for predicting a best direction using the edge direction of each of the pixels, wherein the best direction is adjusted by a direction adjustment, wherein the direction adjustment is implemented using discrete values with a quantization step size, wherein the quantization step size implements a confidence measure, wherein the higher the confidence measure, the smaller the quantization step size.

8. The apparatus of claim 7 wherein the best direction is used in intra coding in encoding the image.

9. The apparatus of claim 7 wherein the best direction module is further for deriving the best direction using a summation of the square of projections of direction vectors onto a unit vector.

10. The apparatus of claim 7 wherein predicting further comprises deriving the best direction by calculating an eigenvector using a matrix and then using a lookup table to convert the eigenvector to the best direction.

11. The apparatus of claim 7 wherein the confidence measure is compared to a threshold for choosing between two pre-defined step size values for the quantization step size.

12. The apparatus of claim 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

13. A device comprising:
   a. a memory for storing an application, the application for:
      i. applying operators to neighboring pixels of a block to obtain an image gradient vector for each of the pixels;
      ii. determining an edge direction for each of the pixels by taking a perpendicular direction to each of the gradient vectors; and
      iii. predicting a best direction using the edge direction for each of the pixels, wherein the best direction is adjusted by a direction adjustment, wherein the direction adjustment is implemented using discrete values with a quantization step size, wherein the quantization step size implements a confidence measure, wherein the higher the confidence measure, the smaller the quantization step size; and
   b. a processing component coupled to the memory, the processing component configured for processing the application.

14. The device of claim 13 wherein the best direction is used in intra coding in encoding the image.

15. The device of claim 13 wherein predicting further comprises deriving the best direction using a summation of the square of projections of direction vectors onto a unit vector.

16. The device of claim 13 wherein predicting further comprises deriving the best direction by calculating an eigenvector using a matrix and then using a lookup table to convert the eigenvector to the best direction.

17. The device of claim 13 wherein the confidence measure is compared to a threshold for choosing between two pre-defined step size values for the quantization step size.

18. A method of encoding an image programmed in a controller in a device comprising:
   a. differentially encoding is implemented for a direction if the direction is close to suggested directions of neighbors of the direction; and
   b. otherwise, using a simple fixed length code to signal the direction of the direction, wherein differentially encoding further comprises:
      i. applying operators to neighboring pixels of a block to obtain an image gradient vector for each of the pixels;
      ii. determining an edge direction for each of the pixels by taking a perpendicular direction to each of the gradient vectors; and
      iii. predicting a best direction using the edge direction for each of the pixels, wherein the best direction is adjusted by a direction adjustment, wherein the direction adjustment is implemented using discrete values with a quantization step size, wherein the quantization step size implements a confidence measure, wherein the higher the confidence measure, the smaller the quantization step size.

19. The method of claim 18 wherein the best direction is used in intra coding in encoding the image.

20. The method of claim 18 wherein predicting further comprises deriving the best direction using a summation of the square of projections of direction vectors onto a unit vector.

21. The method of claim 18 wherein predicting further comprises deriving the best direction by calculating an eigenvector using a matrix and then using a lookup table to convert the eigenvector to the best direction.

22. The method of claim 18 wherein the confidence measure is compared to a threshold for choosing between two pre-defined step size values for the quantization step size.

23. The method of claim 18 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

* * * * *